US011463165B2

(12) United States Patent
Tyner

(10) Patent No.: US 11,463,165 B2
(45) Date of Patent: Oct. 4, 2022

(54) SYSTEMS AND METHODS FOR OPTICAL WIRELESS COMMUNICATIONS

(71) Applicant: Verizon Patent and Licensing Inc., Basking Ridge, NJ (US)

(72) Inventor: Davis Bradley Tyner, Olney, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/102,087

(22) Filed: Nov. 23, 2020

(65) Prior Publication Data

US 2022/0166503 A1    May 26, 2022

(51) Int. Cl.
*H04B 10/11*    (2013.01)
*H04B 7/185*    (2006.01)
*H04W 76/00*    (2018.01)

(52) U.S. Cl.
CPC ......... *H04B 10/11* (2013.01); *H04B 7/18504* (2013.01); *H04W 76/00* (2013.01)

(58) Field of Classification Search
None
See application file for complete search history.

(56) References Cited

U.S. PATENT DOCUMENTS

| | | | |
|---|---|---|---|
| 9,253,397 B2* | 2/2016 | Lee | H04N 5/2258 |
| 11,054,618 B2* | 7/2021 | Lee | G02B 13/0065 |
| 2004/0258415 A1* | 12/2004 | Boone | H04B 10/1125 |
| | | | 398/125 |
| 2007/0031151 A1* | 2/2007 | Cunningham | H04B 10/1127 |
| | | | 398/131 |
| 2013/0177322 A1* | 7/2013 | DeVaul | H04B 7/18504 |
| | | | 398/131 |
| 2017/0193556 A1* | 7/2017 | Sham | H04N 21/2668 |
| 2019/0253142 A1* | 8/2019 | Griffith | H04B 10/1123 |
| 2021/0067246 A1* | 3/2021 | Nykolak | H04B 10/1125 |

OTHER PUBLICATIONS

Alphabet's Loon and Softbank Corp.'s HAPSMobile Complete Development of Communications Payload for HAWK30 Aircraft, Haps Mobile Feb. 6, 2020; https://www.hapsmobile.com/en/news/press/2020/20200206_01/.
Atmosphere of Earth, Wikipedia—https://en.wikipedia.org/wiki/Atmosphere_of_Earth.
Li-Fi, Wikipedia—https://en.wikipedia.org/wiki/Li-Fi.
Odysseus, Aurora Flight Sciences, A Boeing Company; https://www.aurora.aero/odysseus-high-altitude-pseudo-satellite-haps/.
(Continued)

*Primary Examiner* — Jai M Lee

(57) ABSTRACT

An illustrative system obtains connectivity data for an optical wireless communication link between an optical wireless signal transmitter implemented on a first in-flight aerial vehicle and an optical wireless signal receiver implemented on a second in-flight aerial vehicle, determines, based on the connectivity data, a status of the optical wireless communication link, and performs, based on the status of the optical wireless communication link, a connectivity management operation configured to facilitate connectivity of the optical wireless signal receiver with the optical wireless signal transmitter by way of the optical wireless communication link. Corresponding methods and systems are also described.

17 Claims, 9 Drawing Sheets

(56) References Cited

OTHER PUBLICATIONS

Satellite Internet Access, Wikipedia—https://en.wikipedia.org/wiki/Satellite_Internet_access.
Satellite Internet Latency—It's a Physics Thing, https://www.skycasters.com/satellite-internet-service-specs/system-latency/.
Stratosphere, Wikipedia—https://en.wikipedia.org/wiki/Stratosphere.
Submarine Cable Map, Telegeography; https://www.submarinecablemap.eom/#/.
Zephyr: Pioneering the Stratosphere, Airbus; https://www.airbus.com/defence/uav/zephyr.html.
B&H Photo Video, et al., 1200mm Canon 5.6 L Super Telephoto Lens, YOUTUBE (Apr. 28, 2009) https://www.youtube.com/watch?v=U0E-nZOIY_k (video of Helicopter in the air viewable with clarity miles away).
Cherney, et al., Drone Ambitions Soar to the Stratosphere, Wall Street Journal, Aug. 26, 2019; https://www.wsj.com/articles/drone-ambitions-soar-to-the-stratosphere-11566822941.
Cox, et al., Ask the Captain: Highest altitudes for planes, USA Today, May 28, 2017; https://www.usatoday.com/story/travel/columnist/cox/2017/05/28/altitude/102185856/.
Cuthbertson, et al., LiFi internet breakthrough: 224Gbps connection broadcast with an LED bulb, International Business Times, Feb. 18, 2015; https://www.ibtimes.co.uk/lifi-internet-breakthrough-224gbps-connection-broadcast-led-bulb-1488204.
Elmirghiani, et al., Terabit Bidirectional Multi-user Optical Wireless System (TOWS) for 6G LiFi, Engineering and Physical Sciences Research Council Grant, Aug. 28, 2018; https://gow.epsrc.ukri.org/NGBOViewGrant.aspx?GrantRef=EP/S016570/1.
Gomez, et al., Beyond 100-GB/s Indoor Wide Field-of-View Optical Wireless Communications, IEEE Photonics Technology Letters, vol. 27, No. 4, Feb. 15, 2015; https://ieeexplore.ieee.org/document/6967750?arnumber=6967750.
HMS311, et al., 50 mile extreme zoom telephoto pan tilt camera, YOUTUBE (Sep. 13, 2013) https://www.youtube.com/watch?v=379klAzGN_Y (video of 50 mile extreme zoom telephoto pan tilt camera).
Islim, et al., Modulation Techniques for Li-Fi, ZTE Communications, Apr. 2016, vol. 14, No. 2; https://www.zte.com.cn/global/about/magazine/zte-communications/2016/2/en_211/458048.html.
Kauling, et al., Impact of IoT Device Saturation on Home WiFi Networks, Smart Cities Symposium, Bahrain 2018, pp. 1-4; https://ieeexplore.ieee.org/document/8643192.
Ndjiongue, et al., An Overview of Outdoor Visible Light Communications, Transactions on Emerging Telecommunications Technologies, vol. 29, Issue 7, Jul. 2018.
Neal, et al., Underwater Internet Cables: 'Submarine Cable Map' Shows How The World Gets Online, International Business Times, Mar. 5, 2014; https://www.ibtimes.com/underwater-internet-cables-submarine-cable-map-shows-how-world-gets-online-1559604.
Porter, et al., Microsoft and Facebook's record-setting undersea cable sets another record, The Verge, Feb. 28, 2019; https://www.theverge.com/2019/2/28/18244357/microsoft-facebook-marea-cable-16qam-20-percent-speed-boost.
RMA Electronics, Inc., et al., Senko 25-1500mm (62x) Zoom Lens at Distance of 10km (6.2 Miles), YOUTUBE (Dec. 20, 2014) https://www.youtube.com/watch?v=Dc5nw5SmhBk (video of Lighthouse visible at 10km).
Ruddy, et al., The Global Market for Submarine Cables: Insights into Economic Development, Terabit Consulting 2018; https://www.terabitconsulting.com/mt-content/uploads/2018/01/20161013-global-submarine-cable-market-and-submarine-cable-development.pdf.

* cited by examiner

SYSTEMS AND METHODS FOR OPTICAL WIRELESS COMMUNICATIONS

BACKGROUND INFORMATION

Optical wireless communications, such as visual light communication (VLC), Li-Fi, and other free-space optics, use light to carry optical wireless signals between a source and a receiver. For example, a source typically modulates light intensities to represent information and provides the modulated light intensities as optical wireless signals. A receiver receives, demodulates, and interprets the optical wireless signals. The receiver must have line-of-sight connectivity with the source to effectively receive and process the optical signals.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
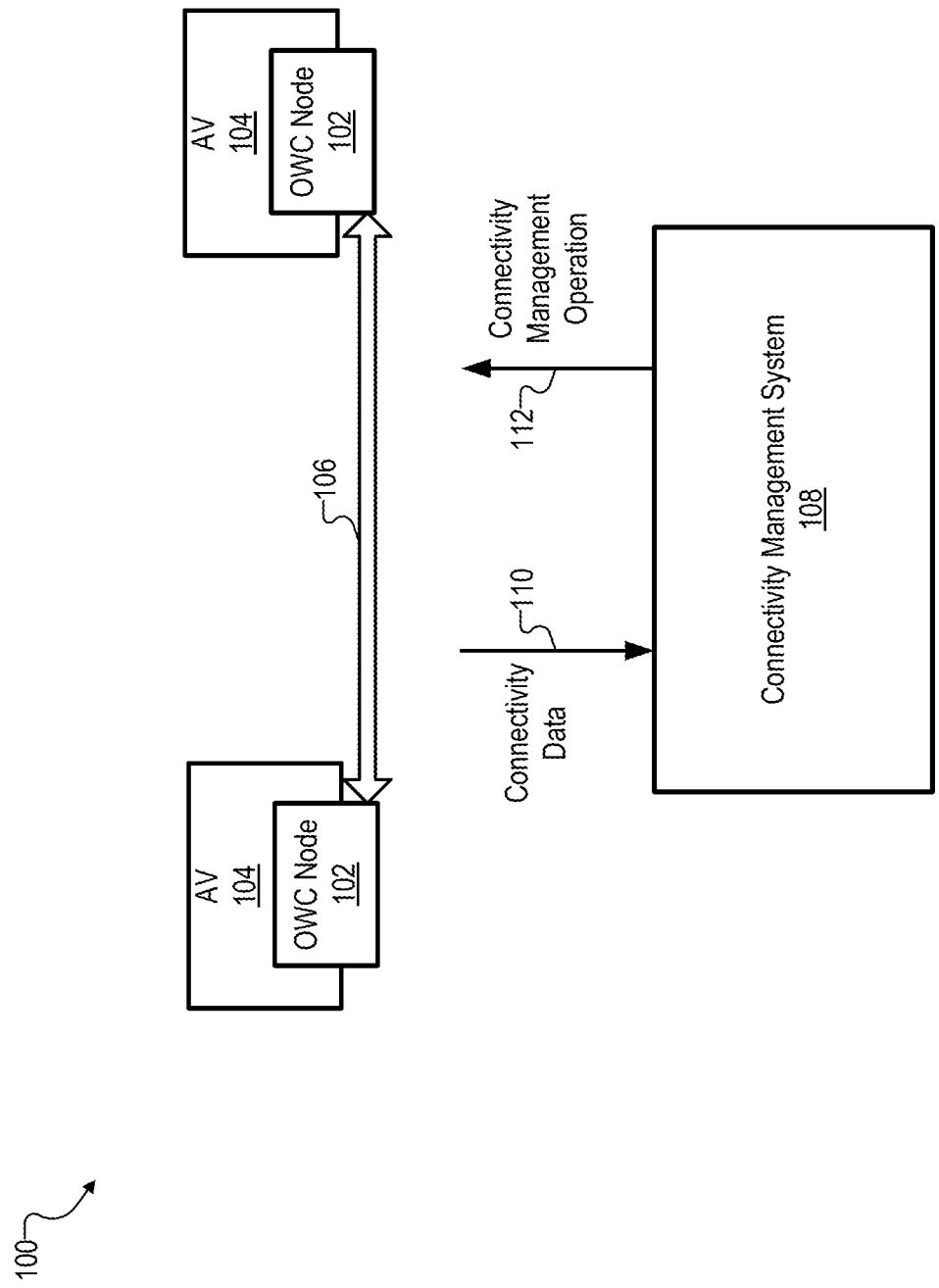
FIG. 1 shows an illustrative optical wireless communications system according to embodiments described herein.

Systems and methods for optical wireless communications are described herein. In certain examples, systems and methods described herein may be configured to provide long-range and/or high-throughput optical wireless communications in a communication network, such as in a backhaul portion of a communication network. As an illustrative example, a communication network may include optical wireless communications (OWC) nodes (e.g., OWC nodes implemented on aerial vehicles) configured to send and receive optical wireless signals over one or more OWC links between the OWC nodes (e.g., when the aerial vehicles are in flight). The OWC links may span large distances (e.g., one or more miles), which may create challenges to maintaining line-of-sight connectivity over the OWC links.

Systems and methods described herein may manage connectivity between OWC nodes of a communication network, such as by establishing, maintaining, and/or improving connectivity (e.g., a state of connection) between the OWC nodes in any of the ways described herein. To illustrate an example, a communication network (e.g., a backhaul portion of a communication network) may include an optical wireless signal transmitter implemented on a first in-flight aerial vehicle (e.g., a first unmanned aerial vehicle (UAV)) and an optical wireless signal receiver implemented on a second in-flight aerial vehicle (e.g., a second UAV). A connectivity management system may be configured to obtain connectivity data for an OWC link between the optical wireless signal transmitter and the optical wireless signal receiver, determine a status of the OWC link based on the connectivity data, and perform, based on the status of the OWC link, a connectivity management operation configured to facilitate connectivity of the optical wireless signal receiver with the optical wireless signal transmitter by way of the optical wireless communication link.

Systems and methods described herein may be configured to facilitate connectivity of OWC nodes implemented in any suitable configuration and particularly for outdoor, long-range implementations of OWC nodes that are not feasible (e.g., not reliable) using conventional technologies. For instance, UAVs equipped with OWC equipment may be deployed to the stratosphere of earth such that long-distance OWC links that support long-range and high-throughput data transmission by way of optical wireless signals over the OWC links may be established and maintained by managing the connectivity of the OWC links in any of the ways described herein.

Such configurations that provide outdoor, long-range OWC links may provide high-speed and/or high-throughput data communications at speeds and/or throughputs that match or are better than those provided by conventional wireless backhaul or core network technologies (e.g., conventional satellite backhaul technologies that have higher latencies, lower throughputs, and/or higher costs) or conventional wired backhaul or core network technologies (e.g., conventional fiber optic cabling or other wired backhaul or core network technologies that have similar or lower throughputs and transmission speeds at higher costs).

Systems and methods described herein may provide additional or alternative features and benefits as may serve a particular implementation. Various example embodiments will now be described with reference to the figures. The example embodiments may provide one or more of the features and benefits mentioned above and/or various additional and/or alternative features and benefits that will be made apparent herein.

FIG. 1 shows an illustrative OWC system 100 (system 100). As shown, system 100 may include OWC nodes 102 implemented on aerial vehicles (AVs) 104 and configured to provide an OWC link 106 between the OWC nodes 102. The AVs 104 may include any type or implementation of aerial vehicle on which the OWC nodes 102 may be implemented and configured to provide an OWC link 106 between the OWC nodes 102 while the AVs 104 are in flight. For example, the AVs 104 may include unmanned aerial vehicles (UAVs) such as drones, balloons, etc. The AVs 104 may be configured to fly at any suitable level of the earth's atmosphere and/or beyond the earth's atmosphere. For example, in certain embodiments the AVs 104 may be configured to fly at stratospheric altitudes in the stratosphere of earth. In certain examples, the AVs 104 may include solar-powered UAVs configured to maintain flight for extended time periods (e.g., months at a time).

The OWC nodes 102 may be configured to provide the OWC link 106 by configuring a transmitter to send and a receiver to receive optical wireless signals between the OWC nodes 102. Accordingly, optical wireless signals may be sent and received over the OWC link 106. The optical wireless signals may include any suitable type or types of optical signals that may be propagated in free space (e.g., in the earth's atmosphere and/or outer space). Such signals may also be referred to as free-space optical signals. In certain examples, the optical signals may include optical signals in the infrared light, visible light, and/or ultraviolet (UV) light frequency bands of the electromagnetic spectrum. For example, the optical signals may include visible light communication (VLC) signals in the visible band (e.g., 390-750 nm) of the electromagnetic spectrum.

An OWC node 102 may be configured to transmit optical wireless signals in any suitable way. For example, the OWC node 102 may be equipped with one or more optical signal transmitters configured to transmit optical signals through free space. Examples of such transmitters include, without limitation, devices that emit infrared, visible, and/or UV light. In certain examples, the OWC node 102 is equipped with one or more light-emitting diodes (LEDs) configured to emit light as optical wireless signals. In certain examples, the OWC node 102 is configured to emit lasers as optical wireless signals.

The OWC node 102 may be configured to generate and emit optical wireless signals that represent information. This may be done in any suitable way that allows the information carried by the signals to be interpreted by a receiver of the optical wireless signals. For example, the OWC node 102 may be configured to modulate light intensities to generate and emit optical wireless signals that represent information. Accordingly, the information may be transmitted as data carried by the optical wireless signals.

The OWC node 102 may be configured to emit optical wireless signals configured to propagate through free space for any suitable distance. In certain examples, the OWC node 102 is configured to emit optical wireless signals configured to propagate through free space for large distances, such as for one or more miles. Such signals may be referred to as long-range optical wireless signals.

An OWC node 102 may be configured to receive optical wireless signals transmitted through free space in any suitable way. For example, the OWC node 102 may be equipped with one or more optical signal receivers configured to receive optical signals transmitted through free space. Examples of such receivers include, without limitation, receptor sensor devices that sense infrared, visible, and/or UV light. In certain examples, the OWC node 102 is equipped with one or more sensors configured to sense light. A sensor may be configured to sense and/or identify specific optical signals such as optical signals having specific wavelengths, frequencies, intensities, pulse patterns, and/or other attributes.

A sensor may be configured to sense optical wireless signals transmitted over any suitable distances (e.g., long-range distances such as one or more miles) and/or within any suitable field of view. For example, a sensor may be configured to sense optical wireless signals within a specific field of view or within a range of selectable fields of view. For instance, the sensor may include or be implemented by a camera having a telephoto lens (e.g., a super-telephoto lens) that is configured to receive optical wireless signals within a narrow field of view, including optical wireless signals transmitted over large distances.

In certain examples, a sensor such as a camera having a telephoto lens may have an adjustable field of view. For example, the lens may be adjusted by adjusting a zoom level of the sensor. In certain examples, the lens may include a telescoping lens that may be adjusted to adjust a zoom level and/or a field of view of the sensor. Pairing any such lens with a light receptor may facilitate reception of optical wireless signals over large distances. In addition, a lens that provides a narrow field of view and allows a sensor to focus in on an optical wireless signal transmitter located a long distance away may filter what the sensor receives such as by "cropping out" potential noise and interference such as may be otherwise caused extraneous sources of light and/or weather conditions.

An OWC node 102 may be configured to transmit optical wireless signals, receive optical wireless signals, or both transmit and receive optical wireless signals. An OWC node 102 may include OWC node equipment configured to perform one or more operations of the OWC node 102. For example, an OWC node 102 may include one or more optical wireless signal transmitters, one or more optical wireless signal receivers, and one or more computer systems (e.g., processors and/or memory storing instructions configured to be executed by the processors) configured to function to perform one or more operations of the OWC node 102.

Figure 2:
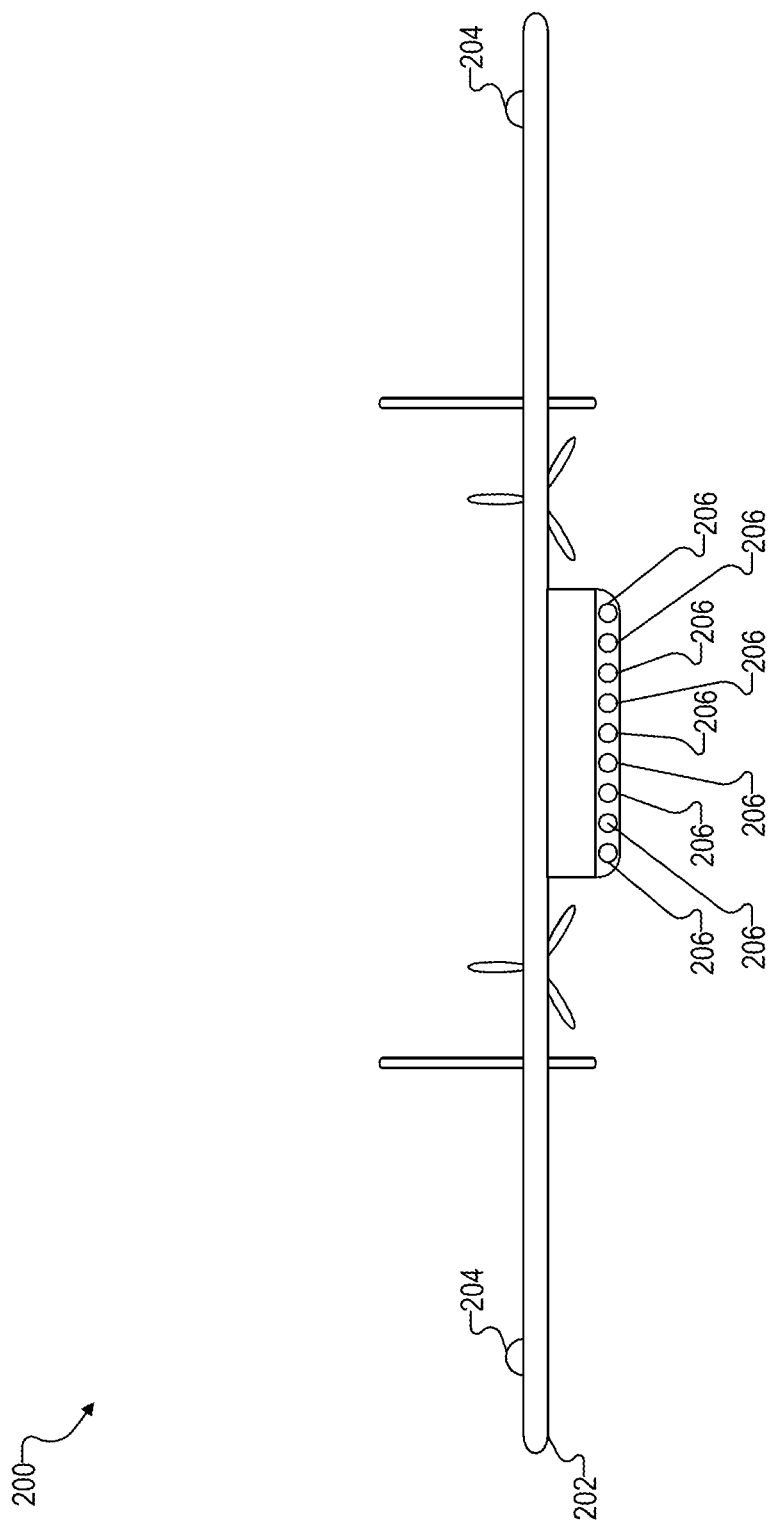
FIG. 2 shows a front view of an illustrative configuration of optical wireless communication equipment implemented on an aerial vehicle according to embodiments described herein.

FIG. 2 shows an illustrative configuration 200 of OWC equipment implemented on an aerial vehicle (AV) 202. In configuration 200, the OWC equipment includes optical wireless signal transmitters 204 (transmitters 204) implemented on wings of the AV 202 and optical wireless signal receivers 206 (receivers 206) implemented on a body of the AV 202. Transmitters 204 (e.g., LEDs) may be configured to emit free-space optical signals in any way suitable to convey information through free space. Receivers 206 (e.g., cameras) may be configured to sense free-space optical signals in any way suitable to support interpretation of information conveyed by the signals. In certain examples, receivers 206 may form an array of receivers 206, such as an array of cameras (e.g., cameras each having a lens paired with a light receptor), configured to receive free-space optical signals. The array of receivers 206 may be configured to receive free-space optical signals from various directions relative to the AV 202.

While FIG. 2 illustrates a certain number of transmitters 204 and a certain number of receives 206 implemented in a specific configuration on a specific AV 202, this is illustrative only. Other configurations may include any suitable number and configuration of transmitters 204 and receivers 206 on any suitable aerial vehicle. Moreover, while illustrative examples are described herein with reference to OWC equipment being implemented on aerial vehicles, one or more principles described herein may apply to other implementations in which OWC equipment is additionally or alternately implemented on other suitable support structures (e.g., utility poles, towers, buildings, satellites, etc.).

Optical wireless signal transmitters and receivers may be configured to have poses suitable for establishing and maintaining OWC links between OWC nodes. As used herein, a pose may refer to a position and orientation of something, such as a position and orientation of a transmitter, receiver, or aerial vehicle. A pose may be defined using any suitable degrees of freedom, such as six degrees of freedom (6DOF) in three-dimensional space (e.g., movement in three dimensions on the X, Y, and Z axes and change in orientation between those axes through rotation referred to as yaw, pitch, and roll). In certain examples, a pose of a transmitter or receiver may be determined by a pose of the aerial vehicle on which the transmitter or receiver is implemented. In certain examples, the pose of the transmitter or receiver may be adjustable relative to the aerial vehicle such that the pose of the transmitter or receiver may be determined by the pose of the aerial vehicle and by a pose of the transmitter or receiver within an adjustable range of poses of the transmitter or receiver relative to the aerial vehicle. For example, the receiver or transmitter may be implemented such that actuation of one or more servo motors may cause the receiver or transmitter to change orientation relative to the aerial vehicle.

An OWC link, such as OWC link 106 shown in FIG. 1, may be any free-space link between OWC nodes 102 over which optical wireless signals may be transmitted by one OWC node 102 and received by another OWC node 102. An OWC link may be a one-way link over which optical wireless signals are transmitted and received in one direction between OWC nodes 102 or a bi-directional link over which optical wireless signals are transmitted and received in two directions between OWC nodes 102. A bi-directional link may be made up of two or more one-way links between OWC nodes 102.

An OWC link that supports communication of data by way of optical wireless signals between OWC nodes 102 may be said to have or provide connectivity between the OWC nodes 102. In certain examples, connectivity may mean that a sufficient line of sight exists between the OWC nodes 102 to support effective communication of data by way of optical wireless signals between the OWC nodes 102. For example, such connectivity may mean that data is able to be transmitted by one OWC node 102 and received and interpreted by another OWC node 102 with at least a defined acceptable threshold of reception and/or accuracy (e.g., no more than an acceptable threshold error rate). On the other hand, a lack of connectivity may mean that an insufficient line of sight exists between the OWC nodes 102 to support effective communication of data by way of optical wireless signals between the OWC nodes 102. For example, such a lack of connectivity may mean that data is unable to be transmitted by one OWC node 102 and received and interpreted by another OWC node 102 with at least a defined acceptable threshold of reception and/or accuracy (e.g., no more than an acceptable threshold error rate).

In certain examples, connectivity may be a binary attribute of an OWC link. That is, an OWC link may either provide or not provide connectivity between OWC nodes 102. In other examples, connectivity may be defined to include more than two levels of connectivity. In such examples, connectivity may refer to a level of data communication supported by an OWC link. The level of data communication may be selected from a defined set of levels of communication that indicate various levels of effectiveness of data communications over an OWC link (e.g., effectiveness of data transmission and reception over the OWC link). Such levels of connectivity may represent various states, qualities, or extents of being connected and/or able to communicate over an OWC link.

Various factors create significant challenges to establishing and maintaining connectivity of an OWC link in free space over long distances. For example, connectivity of an OWC link may be adversely impacted by external sources of light, such as natural sources of light like the sun, the moon, and stars or man-made sources of light such as city lights. As another example, weather conditions such as fog, smoke, clouds, storms, and the like may adversely impact connectivity of an OWC link. Such weather conditions and other sources of light, which are common in earth's troposphere, cause interference and noise that adversely impacts line of sight and/or connectivity between OWC nodes 102, such as by diffusing optical wireless signals. As another example, movement of OWC nodes 102 (e.g., changes in poses of transmitters and/or receivers of OWC nodes 102) may adversely impact line of sight and, consequently, the connectivity between OWC nodes 102. For a long-range OWC link, even small changes in one or more of the above-described factors (e.g., a small change in the pose of a receiver on an OWC node 102 such as may be caused by movement of an AV 104, a gust of wind, etc.) may adversely impact the connectivity of an OWC link between OWC nodes 102.

Systems and methods described herein may be configured to facilitate connectivity of an OWC link between OWC nodes 102, such as by performing operations to address challenges to connectivity of the OWC link. Referring again to FIG. 1, system 100 may include a connectivity management system 108 (system 108) configured to perform operations to facilitate connectivity of an OWC link between OWC nodes 102. In certain examples, system 108 may be configured to facilitate connectivity of an OWC link such as OWC link 106 between OWC nodes 102 by performing operations that include obtaining connectivity data 110 associated with OWC link 106, determining a status of the OWC link 106 based on the connectivity data, and performing, based on the status, a connectivity management operation 112 configured to facilitate connectivity between the OWC nodes 102.

Connectivity data 110 obtained by system 108 may include any data that indicates information about OWC link 106 and/or the connectivity of OWC link 106. Additionally or alternately, connectivity data 110 obtained by system 108 may include any data from which information about OWC link 106 and/or the connectivity of OWC link 106 may be derived by system 108. Illustrative examples of connectivity data 110 will now be described.

In certain examples, connectivity data 110 may indicate information about OWC nodes 102 associated with OWC link 106. Such information may indicate attributes of a transmitting OWC node 102 and/or a receiving OWC node 102 associated with OWC link 106. As an example, connectivity data 110 may indicate information about a pose of an OWC node 102 itself, a pose of a receiver at the receiving OWC node 102, and/or a pose of a transmitter at the transmitting OWC node 102. As another example, connectivity data 110 may indicate information about a field of view and/or a zoom level of a receiver at the receiving OWC node 102. These examples are illustrative only. Connectivity data 110 may indicate any additional or alternate information about extrinsic and/or intrinsic attributes of an OWC node 102, such as a receiver at the receiving OWC node 102 (e.g., intrinsic and/or extrinsic camera properties).

In certain examples, connectivity data 110 may indicate information about AVs 104 associated with OWC link 106. Such information may indicate attributes of an AV 104, such as a pose, a velocity, a direction of travel (e.g., a heading), a speed, an altitude, and/or any other attribute of the AV 104.

In certain examples, connectivity data 110 may indicate information about weather conditions associated with OWC link 106. For example, connectivity data 110 may indicate information about fog, smoke, clouds, storms, precipitation, air temperature, air pressure, etc. that may affect OWC link 106 (e.g., weather conditions in geographic proximity to OWC link 106 and/or the OWC nodes 102 providing OWC link).

In certain examples, connectivity data 110 may indicate information about other light sources associated with OWC link 106 (i.e., light sources other than a light source being transmitted and receiving over OWC link 106). As an example, connectivity data 110 may indicate information about natural light sources such as the sun, the moon, and/or stars (e.g., information about the positions of such light sources). As another example, connectivity data 110 may indicate information about man-made light sources such as city lights and/or satellites (e.g., information about the positions of such light sources).

In certain examples, connectivity data 110 may indicate information about optical wireless signals propagated over OWC link 106. As an example, connectivity data 110 may indicate information about an optical wireless signal transmitted by a transmitting OWC node 102 (e.g., information about signal strength, wavelength, frequency, intensity, direction of emittance, etc.). As another example, connectivity data 110 may indicate information about an optical wireless signal received by a receiving OWC node 102 (e.g., information about signal strength, wavelength, frequency, intensity, position of receptance on a receiving sensor or sensor array, angle of incidence on a sensor, etc.).

In certain examples, connectivity data 110 may indicate information about reception and/or processing of optical wireless signals over OWC link 106. As an example, connectivity data 110 may indicate a measure of quality and/or quantity of a received optical wireless signal. For instance, connectivity data 110 may indicate a percentage, ratio, and/or a particular portion of a surface area of a sensor or sensor array that receives the optical wireless signal (e.g., that receives the optical wireless signal having at least a defined threshold signal strength). As another example, connectivity data 110 may indicate a measure of quality of a processed optical wireless signal. For instance, connectivity data 110 may indicate an estimated level of accuracy, error rate, confidence score, etc. for data deciphered from the optical wireless signal.

In certain examples, system 108 may be configured to obtain connectivity data 110 in real-time, which may mean that connectivity data 110 is obtained immediately and without undue delay, even if it is not possible for there to be absolutely zero delay. Connectivity data 110 received and processed in real-time may be referred to real-time connectivity data 110 that represents current conditions associated with OWC link 106. In certain examples, connectivity data 110 may additionally or alternatively indicate historical information about past conditions associated with OWC link 106.

In certain examples, connectivity data 110 may indicate information about change (e.g., a rate of change) in any of the illustrative information associated with OWC link 106 described herein. For example, connectivity data 110 may indicate a change in any of the attributes described above, such as a change in attributes of OWC link 106, connectivity of OWC link 106, OWC nodes 102 associated with OWC link 106, AVs 104 associated with the OWC nodes 102, optical wireless signals associated with OWC link 106, weather conditions associated with OWC link 106, and/or other light sources associated with OWC link 106.

In certain examples, connectivity data 110 may indicate information about one or more additional OWC links other than OWC link 106 between OWC nodes 102. An additional OWC link may be an additional OWC link between the same pair of OWC nodes 102 or an OWC link between another pair of OWC nodes 102.

System 108 may be configured to obtain connectivity data 110 from any suitable source(s), including OWC nodes 102, AVs 104, and/or any other sources. System 108 may be communicatively coupled to any such sources using any suitable communication technologies.

In certain examples, connectivity data 110 may be obtained by system 108 from in-band connectivity data 110 carried in optical wireless signals propagated over OWC link 106 and/or from out-of-band connectivity data 110 received in some other way (e.g., by way of satellite communications, radio-frequency communications, a different OWC link, etc.).

System 108 may be configured to determine a status of OWC link 106 based on connectivity data 110. The status of OWC link 106 may indicate a state of connectivity for OWC link 106, which state may indicate whether there is connectivity across OWC link 106, whether there is a lack of connectivity across OWC link 106, a level of connectivity across OWC link 106, and/or a change in connectivity across OWC link 106.

System 108 may determine a past, a current, and/or a predicted status of OWC link 106. As an example, based on real-time connectivity data 110, system 108 may determine a current, real-time status of OWC link 106. As another example, based on historical connectivity data 110 or a combination of historical and real-time connectivity data 110, system 108 may determine a predicted status of OWC link 106.

System 108 may be configured to determine the status of OWC link 106 in any suitable way and based on any individual instance or type of connectivity data or based on any combination or sub-combination of instances or types of connectivity data 110, including any the illustrative examples of connectivity data 110 described herein. For example, system 108 may determine the status of OWC link 106 based on one or more of information about OWC nodes 102 associated with OWC link 106, information about AVs 104 associated with OWC link 106, information about weather conditions associated with OWC link 106, information about other light sources associated with OWC link 106, information about optical wireless signals associated with OWC link 106, and/or information about reception and/or processing of received optical wireless signals associated with OWC link 106.

In certain examples, system 108 may be configured to aggregate certain instances and/or types of connectivity data 110 to determine the status of OWC link 106. Such aggregation may be performed by system 108 in any suitable way, including by assigning different weights to different instances and/or types of connectivity data 110 to determine the status of OWC link 106.

System 108 may be configured to represent the status of OWC link 106 in any suitable way. For example, the status of OWC link may be represented as a connectivity score within a defined scale of connectivity scores.

Based on the status of OWC link 106, system 108 may perform a connectivity management operation 112 configured to facilitate connectivity over OWC link 106. This may include system 108 identifying and performing, based on the status of OWC link 106, one or more processes configured to facilitate connectivity over OWC link 106.

In certain examples, an operation configured to facilitate connectivity over OWC link 106 may refer to any operation configured to maintain a current connectivity and/or maintain a current level of connectivity of OWC link 106. In certain examples, an operation configured to facilitate connectivity over OWC link 106 may refer to any operation configured to improve connectivity over OWC link 106. For example, an operation may be configured to improve connectivity over OWC link 106 from a lack of connectivity to connectivity over OWC link 106, or from one level of connectivity to another level of connectivity that provides improved connectivity over OWC link 106. In certain examples, an operation configured to facilitate connectivity over OWC link 106 may refer to any operation configured to maintain or improve a probability of maintaining or improving a current connectivity or level of connectivity of OWC link 106.

In certain examples, a connectivity management operation may include system 108 directing a transmitting OWC node 102 and/or a receiving OWC node 102 associated with OWC link 106 to perform one or more operations configured to facilitate connectivity between the OWC nodes 102. As an example, system 108 may direct the receiving OWC node 102 to adjust a pose of an optical wireless signal receiver (e.g., a telephoto lens of the receiver) from one pose to another pose that is better suited to receive optical wireless signals emitted by the transmitting OWC node 102. As another example, system 108 may direct the receiving OWC node 102 to adjust another attribute of the receiver, such as a zoom level of the receiver, to a value that is better suited to receive optical wireless signals emitted by the transmitting OWC node 102. For instance, system 108 may direct the receiving OWC node 102 to adjust a zoom of a telescoping lens of the optical wireless signal receiver from a first zoom level to a second zoom level (e.g., a zoom out) to search, at the second zoom level, for an optical wireless signal from the optical wireless signal transmitter. Once a suitable optical wireless signal is located at the second zoom level, system 108 may direct the telescoping lens to zoom in (e.g., from the second zoom level to the first zoom level) on the optical wireless signal.

Additionally or alternately to directing the receiving OWC node 102 to perform such operations, system 108 may direct the transmitting node 102 to perform similar operations to adjust one or more attributes of the transmitting OWC node 102 (e.g., an optical wireless signal transmitter) and/or optical wireless signals transmitted by the transmitting OWC node 102 (e.g., a wavelength, frequency, amplitude, strength, intensity, modulation, etc. of the signals).

In certain examples, a connectivity management operation may include system 108 directing one or more AVs 104 associated with OWC link 106 to perform one or more operations configured to facilitate connectivity between the OWC nodes 102. As an example, system 108 may direct the AV 104 carrying the receiving OWC node 102 and/or the AV 104 carrying the transmitting OWC node 102 to change one or more attributes of the AVs 104, such as a pose, a heading, a speed, etc. of the AVs 104 to values that are better suited to maintain and/or improve connectivity over OWC link 106.

In certain examples, system 108 may track flight information and/or attributes of AVs 104. This information may be included in connectivity data 110 obtained by system 108 and used to determine a status of an OWC link 106. For example, system 108, with may be implemented at least in part on AVs 104, may be aware of the flight paths of the AVs 104.

In certain examples, system 108 may be permitted to direct AVs 104 to automatically make fine-tuning type of adjustments to attributes (e.g., flight attributes) of the AVs 104 to a defined extent to facilitate connectivity across OWC link 106. Accordingly, AVs 104 may make allowed adjustments within defined tolerances within the context of overall flight plans or attributes.

Illustrative examples of system 108 determining a status of OWC link 106 and performing a connectivity management operation based on the status of OWC link 106 will now be described. The examples are illustrative. System 108 may be configured to determine other statuses of OWC link 106 and/or perform other connectivity management operations in other examples.

In certain examples, system 108 may identify a movement of an optical wireless signal being received by an optical wireless signal receiver to a periphery region of a field of view of the optical wireless signal receiver. The identified movement may be a status of OWC link 106 or may be used by system 108 to determine a status of OWC link 106. The movement of the optical wireless signal to a periphery region of the receiver may include a movement of the optical wireless signal from a central region to a periphery region of the field of view of the receiver or a movement of the optical wireless signal from outside the field of view of the receiver to a periphery region of the field of view of the receiver. The field of view of the receiver may be a field of view of a single lens (e.g., a telephoto lens) of the receiver or an aggregate field of view of an array of lenses of the receiver.

In response to identifying the movement of the optical wireless signal to a periphery region of a field of view of the optical wireless signal receiver, system 108 may perform a connectivity management operation configured to bring a central region of the field of view of the receiver toward the optical wireless signal. For example, system 108 may adjust a pose and/or a zoom of the receiver to bring a central region of the field of view of the receiver toward the optical wireless signal.

In certain examples, system 108 may perform a connectivity management operation configured to coordinate a handoff of an optical wireless signal from one optical wireless signal receiver to another optical wireless signal receiver. This may include handing off the optical wireless signal from one receiver implemented on one AV 104 to another receiver implemented on another AV 104 or handing off the optical wireless signal from one receiver to another receiver implemented on the same AV 104. For example, a receiver may include an array of lenses (e.g., telephoto lenses) configured to receive an optical wireless signal, and the handoff of the signal be a handoff from a first lens to a second lens in the array of lenses.

System 108 may be configured to coordinate a handoff of an optical wireless signal from one optical wireless signal receiver to another optical wireless signal receiver in response to determining a particular status of OWC link 106. For example, system 108 may determine that an optical wireless signal has moved across the field of view of a lens or an array of lenses to a periphery region of the field of view or outside the field of view and/or that the optical wireless signal has moved into the field of view of another lens or another array of lenses. In response, system 108 may coordinate a handoff of the optical wireless signal from the first lens or array of lenses to the second lens or array of lenses.

In certain examples, system 108 may be configured to use information about optical wireless signals received by different types of sensors to determine a status of OWC link 106 and perform a connectivity management operation based on the status. For example, an optical wireless signal receiver may include different types of sensors, such as a configuration of one or more data signal receivers and one or more tracking signal receivers. For instance, an optical wireless signal receiver may include a telephoto lens having a narrow field of view and a tracking lens having a wider-angle field of view than the telephoto lens. The telephoto lens may be configured to function as a primary data signal receiver, and the tracking lens may be configured to function as a tracking signal receiver for tracking a position of an optical wireless signal transmitter. System 108 may be configured to obtain at least a portion of connectivity data 110 by way of the tracking lens.

System 108 may be configured to determine a status of OWC link 106 based at least in part on connectivity data 110 that includes data provided by the tracking lens and its paired sensor (e.g., imagery captured by the tracking lens and paired sensor). Based on the status, system 108 may perform a connectivity management operation 112 to facilitate connectivity of the telephoto lens with the optical wireless signal transmitter. For example, based on a position and/or a movement of the optical wireless signal transmitter in imagery captured by the tracking lens and sensor, system 108 may direct the telephoto lens and/or its paired sensor to perform an operation such as by adjusting a pose of the telephoto lens and/or its paired sensor based on the position and/or a movement of the optical wireless signal transmitter depicted in the imagery.

To illustrate one example, system 108 may determine a potential issue with reception of an optical wireless signal by the telephoto lens. For example, the signal may have moved outside the narrow field of view of the telephoto lens. In response, system 108 may analyze imagery captured by the tracking lens, such as by determining a location of a transmitter of the optical wireless signal within the field of view of the tracking lens. Based on the analysis, system 108 adjust an attribute of the telephoto lens (e.g., a pose and/or a zoom level of the telephoto lens) to bring the optical wireless signal back into the field of view of the telephoto lens.

In certain examples, system 108 may be configured to determine a potential issue with reception of an optical wireless signal by a telescoping lens having an adjustable zoom level. For example, the signal may have moved outside the narrow field of view of the telescoping lens set at a first zoom level. In response, system 108 may adjust the zoom level of the telescoping lens to zoom out (e.g., from the first zoom level to a second zoom level) to have a wider field of view and to search the wider field of view for the optical wireless signal. While zoomed out, system 108 analyze imagery captured by the telescoping lens, such as by determining a location of a transmitter of the optical wireless signal within the adjusted field of view of the telescoping lens. Based on the analysis, system 108 adjust an attribute of the telescoping lens (e.g., a pose and/or a zoom level of the telescoping lens) to bring the optical wireless signal back into the more narrow field of view of the telescoping lens. In certain examples, this may include directing the telescoping lens to zoom back in (e.g., to the first zoom level) and focus in on the located optical wireless signal.

In certain examples, system 108 may be configured to obtain information about attributes an AVs 104 and to use the information to assist with initial positioning of the AVs 104 to establish OWC links 106 between the AVs 104 and/or connectivity over the OWC links 106. For example, system 108 may obtain position information (e.g., Global Positioning System (GPS) location and altitude information) for AVs 104 in an area and/or that form a chain of AVs 104 and, based on the position information, may direct one or more of the AVs 104 to move to specific positions that are conducive to establishing OWC links 106 between the AVs 104 and/or connectivity over the OWC links 106. In an example implementation, a portion of system 108 implemented on one AV 104 may obtain position information for positionally adjacent AVs 104 (e.g., the next one, two, three, or four AVs 104 in a line) and, based on the information, direct the AV 104 to move to a specific position that is conducive to establishing and/or maintaining OWC links 106 between the AV 104 and adjacent AVs 104. Such information may be communicated to system 108 and/or between AVs 104 using any suitable communication technologies. For example, AVs 104 may be configured to use satellite networks to communicate position information to one another. Such satellite communications and their latencies may be suitable for the exchange and use of position information between the AVs 104, particularly when the information is used to assist with initial positioning and/or repositioning of AVs 104. The latencies of the satellite communications may be mitigated when the AVs 104 are positioned at high altitudes (e.g., stratospheric altitudes) relatively closer to the satellites.

System 108 may be implemented in any way suitable to perform operations of system 108 described herein. In certain examples, system 108 is communicatively coupled to one or more of OWC nodes 102, AVs 104, and/or sources of connectivity data 110 using any suitable communication technologies. Accordingly, system 108 may obtain connectivity data 110 from one or more sources, determine a status of OWC link 106 based on the connectivity data 110, and perform a connectivity management operation 112 based on the status. Performance of the connectivity management operation 112 may include system 108 communicating with any of OWC nodes 102 and/or AVs 104 to direct performance of the connectivity management operation 112.

System 108 may include or be implemented by one or more computing systems. In certain examples, system 108 may be implemented by one or more computing systems of one or more OWC nodes 102 and/or by one or more computing systems that are separate from and communicatively coupled to OWC nodes 102.

Figure 3:
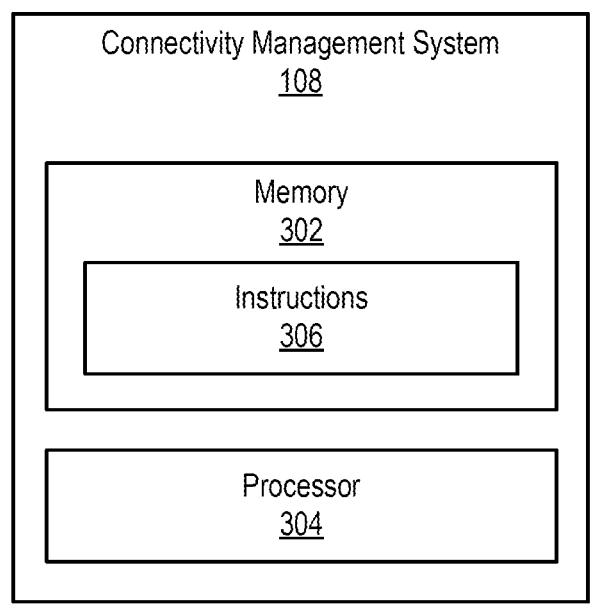
FIG. 3 shows an illustrative connectivity management system configured to manage connectivity in an optical wireless communications system according to embodiments described herein.

FIG. 3 shows an illustrative implementation of system 108. As shown, system 108 may include, without limitation, a memory 302 and a processor 304 selectively and communicatively coupled to one another. Memory 302 and processor 304 may each include or be implemented by computer hardware that is configured to store and/or execute computer software. Various other components of computer hardware and/or software not explicitly shown in FIG. 3 may also be included within system 108. In some examples, memory 302 and processor 304 may be distributed between multiple devices and/or multiple locations.

Memory 302 may store and/or otherwise maintain executable data used by processor 304 to perform any of the functionality of system 108 described herein. For example, memory 302 may store instructions 306 that may be executed by processor 304. Memory 302 may be implemented by one or more memory or storage devices, including any memory or storage devices described herein, that are configured to store data in a transitory or non-transitory manner. Instructions 306 may be executed by processor 304 to cause system 108 to perform any of the functionality of system 108 described herein. Instructions 306 may be implemented by any suitable application, software, code, and/or other executable data instance. Additionally, memory 302 may also maintain any other data accessed, managed, used, and/or transmitted by processor 304.

Processor 304 may be implemented by one or more computer processing devices, including general purpose processors (e.g., central processing units (CPUs), graphics processing units (GPUs), microprocessors, etc.), special purpose processors (e.g., application-specific integrated circuits (ASICs), field-programmable gate arrays (FPGAs), etc.), or the like. Using processor 304 (e.g., when processor 304 is directed to perform operations represented by instructions 306 stored in memory 302), system 108 may perform functions of system 108 as described herein and/or as may serve a particular implementation.

Systems and methods described herein may be implemented in various configurations that provide optical wireless communications. Examples of such illustrative configurations will now be described.

Figure 4:
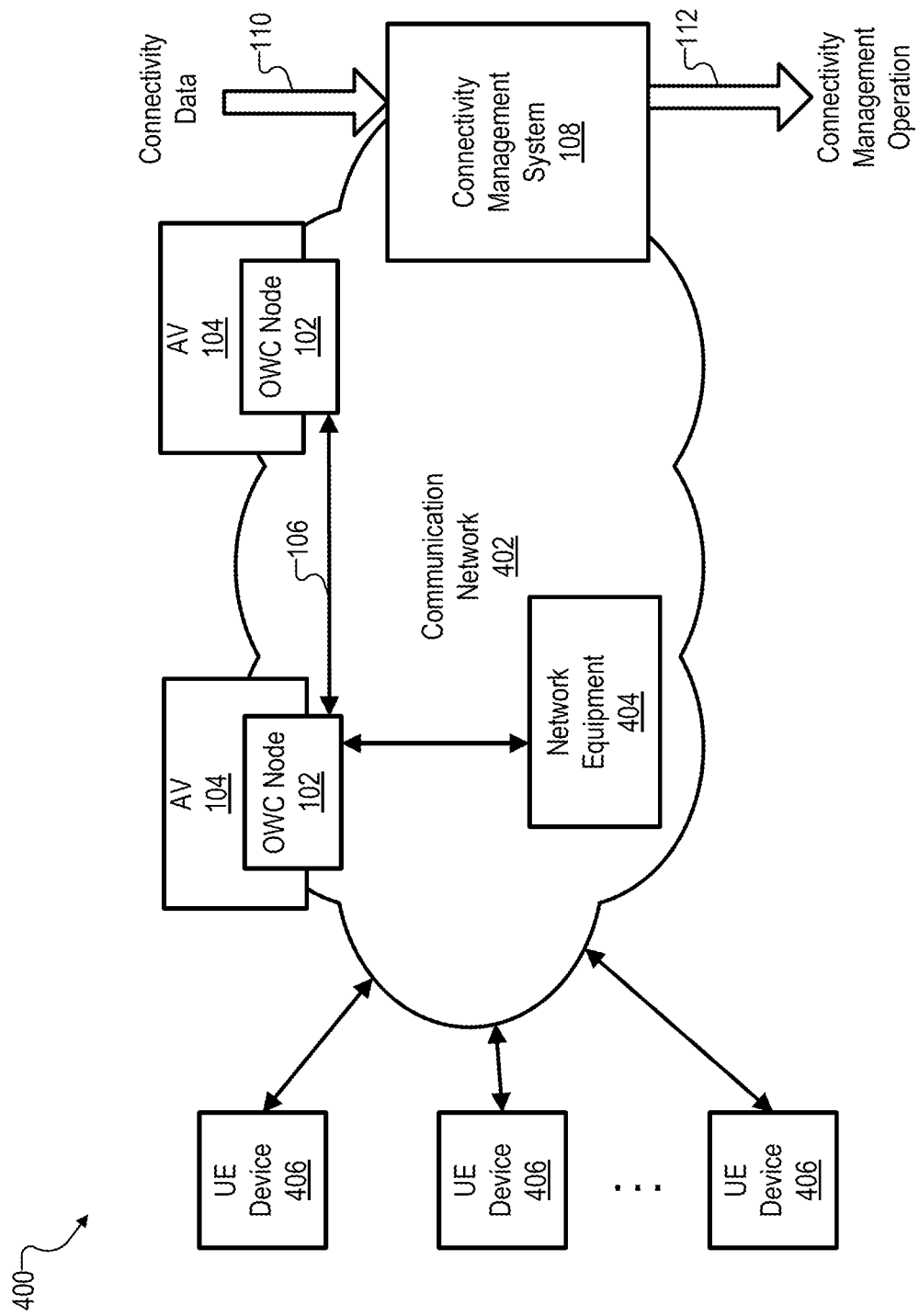
FIGS. 4-7 show illustrative configurations of an optical wireless communications system according to embodiments described herein.

FIG. 4 illustrates an example configuration 400 that includes elements of system 100 implemented in a communication network 402. Communication network 402 may include network equipment 404 deployed at distributed locations throughout communication network 402 and configured to provide certain services to user equipment (UE) devices 406 that are communicatively coupled to communication network 402. Illustrative services may include, without limitation, network connectivity services, data communication services, and/or any services that use network connectivity and/or data communications. Examples of such services include, but are not limited to, data streaming services, mobile application services, software-as-a-service services, platform-as-a-service services, infrastructure-as-a-service services, multi-access server services (e.g., cloud computing services and/or multi-access edge computing (MEC) services), communication services (e.g., messaging service, voice communication services, video communication services, etc.), and digital content delivery services.

Each UE device 406 may be implemented as any computing device configured to communicatively couple to communication network 402 and to request and/or receive services by way of communication network 402. UE devices 406 may be associated with one or more users. For example, a UE device 406 implemented as a personal computer (e.g., a desktop or laptop computer, etc.) or a mobile device (e.g., a smartphone or tablet device, etc.) may be controlled by a user of the UE device 406. Other types of UE devices 406 (e.g., certain Internet-of-Things (IoT) devices and embedded systems such as may be employed in smart appliances, specialized testing or automation equipment, etc.) may not be associated with a specific user, or may be one of multiple UE devices 406 controlled by a single user.

Network equipment 404 may include multiple distinct instances of network equipment 404 deployed at distributed locations throughout communication network 402. Instances of network equipment 404 included in communication network 402 may include or be implemented by a computing system (e.g., a server, a blade server, an edge server, a set of servers at a single site, etc.) that includes a set of computing resources (e.g., memory, processing, throughput, latency, and/or other computing resources). The computing resources may include and/or may be provided using a combination of hardware and software resources.

Network equipment 404 may include various types of network equipment 404 deployed throughout communication network 402. For example, network equipment 404 may include routers, gateways, hubs (e.g., CRAN and/or DRAN hubs), radio transceivers, antennas, radio access network (RAN) equipment, servers, and/or any other types of network equipment 404. In certain examples, certain network equipment 404 includes multi-access servers that are each accessible to multiple UE devices 406 and configured to perform processing and data services for the UE devices 406. Such multi-access servers may include multi-access edge compute (MEC) servers implemented within a provider network of communication network 402 (e.g., so as to be near the edge of communication network 402 where UE devices connect to the network) and/or other multi-access servers (e.g., cloud servers) implemented farther from the edge of the provider network (e.g., within external networks that are accessible to UE devices by way of the provider network).

Communication network 402 may represent various networks or parts of networks used to enable communication between UE devices 406 and network equipment 404. To this end, communication network 402 may implement or employ any suitable communication technologies, devices, media, protocols, or the like as may serve a particular implementation. In some examples, communication network 402 may include a provider network and/or additional networks outside of the provider network (e.g., external networks associated with the Internet).

A provider network included within communication network 402 may be implemented as a provider-specific wired or wireless communications network (e.g., a cellular network used for mobile phone and data communications, a 4G network, a 5G network, or a network of another suitable technology generation, a cable or satellite carrier network, a mobile telephone network, a traditional telephone network, etc.), and may be operated and managed by a provider entity such as a mobile network operator (e.g., a wireless service provider, a wireless carrier, a cellular company, etc.). The provider of the provider network may own or control all of the elements necessary to deliver communication services to UE devices 406, including radio spectrum allocation, wireless network infrastructure, back haul infrastructure, customer care, provisioning of devices, and so forth.

In various examples, a provider network included within communication network 402 may include or consist of various network resources that may be associated with network equipment 404 such as MEC servers. For instance, one or more radio access network (RAN) resources may directly communicate with UE devices 406 and may provide access to MEC servers integrated with and/or communicatively coupled to the RAN resources, one or more transport access point (TAP) resources may communicate with UE devices 406 indirectly (e.g., by way of the RAN resources) and may provide access to additional integrated MEC servers, one or more service access point (SAP) resources may communicate with UE devices 406 indirectly (e.g., by way of the RAN and/or TAP resources) and may provide access to still other integrated MEC servers, and so forth. In all of these examples, the MEC servers integrated within the network resources may implement certain network equipment 404 shown in configuration 100. Additionally, in some examples, other network resources may likewise assist in providing communication services for UE devices 406 and/or may provide access to MEC servers or other network equipment 404 in any manner as may serve a particular implementation.

Along with a provider network such as has been described, communication network 402 may further include elements of one or more additional networks external to the provider network (e.g., third-party networks associated with the Internet, etc.). Access to additional network equipment 404 (e.g., cloud servers, etc.) beyond the MEC servers of the provider network may be provided by these additional networks. Certain additional network elements within communication network 402 may be included within peer networks connected to the provider network by high bandwidth connections (e.g., direct fiber optic lines, etc.), such that certain network equipment 404 may be operated on the peer networks. Other network elements of communication network 402 may be associated with networks external to the provider network, such that other network equipment 404 may be implemented by cloud servers operated by cloud computing enterprises.

In addition to network equipment 404, configuration 400 may include one or more OWC nodes implemented and configured to provide one or more OWC links. The OWC nodes and links may form at least a portion of communication network 402, such as a backhaul portion and/or a core portion of communication network 402. In certain examples, the OWC nodes and links may be configured to communicatively couple a provider network and one or more networks external to the provider network.

As shown in FIG. 4, configuration 400 may include OWC nodes 102 implemented on AVs 104 and configured to provide OWC link 106. One or more of OWC nodes 102 may be communicatively coupled to network equipment 404 using any suitable communication technologies. OWC nodes 102 and OWC link 106 may form a portion of communication network 402, such as a backhaul portion and/or a core portion of communication network 402. Configuration 400 may further include system 108 configured to perform any of the functions of system 108 described herein, including obtaining connectivity data 110, determining a status of OWC link 106 based on the connectivity data 110, and performing a connectivity management operation 112 based on the status of the OWC link 106 to facilitate connectivity over OWC link 106.

In certain examples, AVs 104 included in configuration 400 may be configured to fly in the stratosphere of earth's atmosphere, which may help minimize the interference and noise that affects the connectivity of OWC link 106. For example, by AVs 104 flying in the stratosphere of earth's atmosphere, the effects of weather conditions (e.g., storms, clouds, etc.) and external light sources (e.g., city lights, other air traffic, etc.) may be minimized. This may help system 108 maintain the connectivity of OWC link 106. In addition, in certain examples, OWC nodes 102 may include super-telephoto lenses that can be narrowly focused in on optical wireless signal transmitters, which may also help minimize any negative effects of weather conditions and external lights on the connectivity of OWC link 106.

Figure 5:
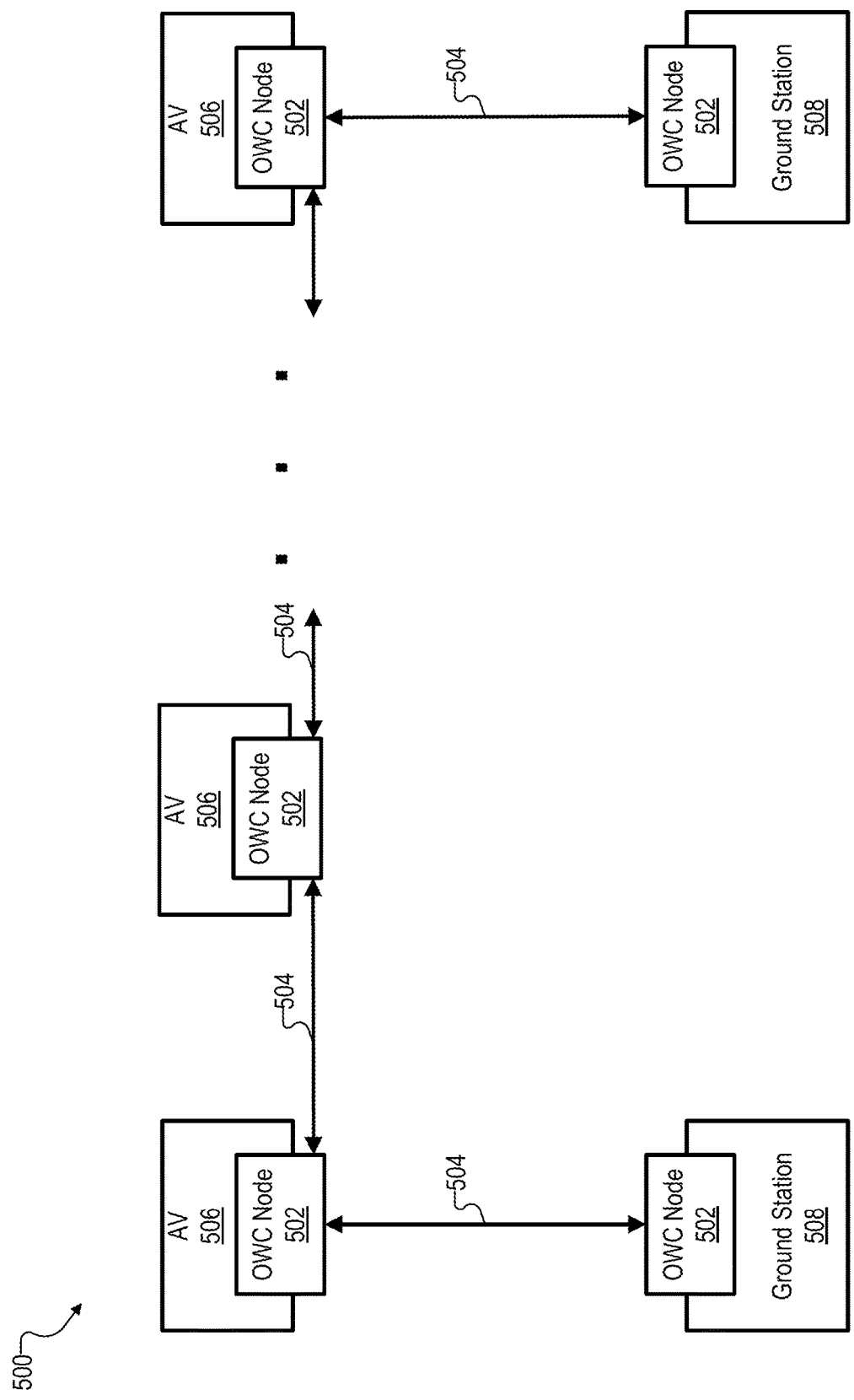

FIG. 5 illustrates an example configuration 500 that includes OWC nodes 502 configured to transmit and receive optical wireless signals over OWC links 504 that are chained together to form a communication network or a portion of a communication network. As shown, certain OWC nodes 502 may be implemented on AVs 506 and may provide OWC links 504 between the OWC nodes 502. Such OWC nodes 502, OWC links 504, and AVs 506 may be configured and/or function in any of the ways described herein.

Certain other OWC nodes 502 may be implemented at ground stations 508, which may be positioned at or near the surface of the earth. Ground stations may include any suitable structures (e.g., towers, buildings, etc.) on which equipment of OWC nodes 502 may be implemented. As shown, OWC nodes 502 implemented at ground stations 508 may provide OWC links 504 with certain OWC nodes 502 implemented on certain AVs 506. Accordingly, a chain of OWC links 504 is formed between the ground stations 508.

Connectivity of an OWC link 504 between an OWC node 502 at a ground station 508 and an OWC node 502 on an AV 506 may be managed in any suitable way, including in one or more of the ways described herein. Additional or alternate ways of managing connectivity may be applied for an OWC link 504 between a ground station 508 and an AV 506. These ways may address certain challenges to maintaining connectivity of such an OWC link 504, such as challenges caused by weather conditions and/or external lights between the earth's surface and the altitude of the AV 506 (e.g., weather conditions below the earth's stratosphere).

As an example, multiple OWC nodes 502 implemented on one or more AVs 506 may be positioned in flight at various positions above a ground station 508. Each of the OWC nodes 502 on the AVs 506 may be configured to search for and receive optical wireless signals from the OWC node 502 at the ground station 508. Similarly, the OWC node 502 at the ground station 508 may be configured to search for and receive optical wireless signals from any of the OWC nodes 502 on the AVs 506 positioned within line of sight of the ground station 508. Positioning multiple airborne OWC nodes 502 within sight of an OWC node 502 at a ground station 506 may provide line of sight redundancies such that when line of sight with one AV 506 is compromised and insufficient to support connectivity another line of sight with another AV 506 may be sufficient to support connectivity. Positioning multiple airborne OWC nodes 502 within sight of an OWC node 502 at a ground station 506 may also provide data reception and processing redundancies for error checking, identification, and correction.

Figure 6:
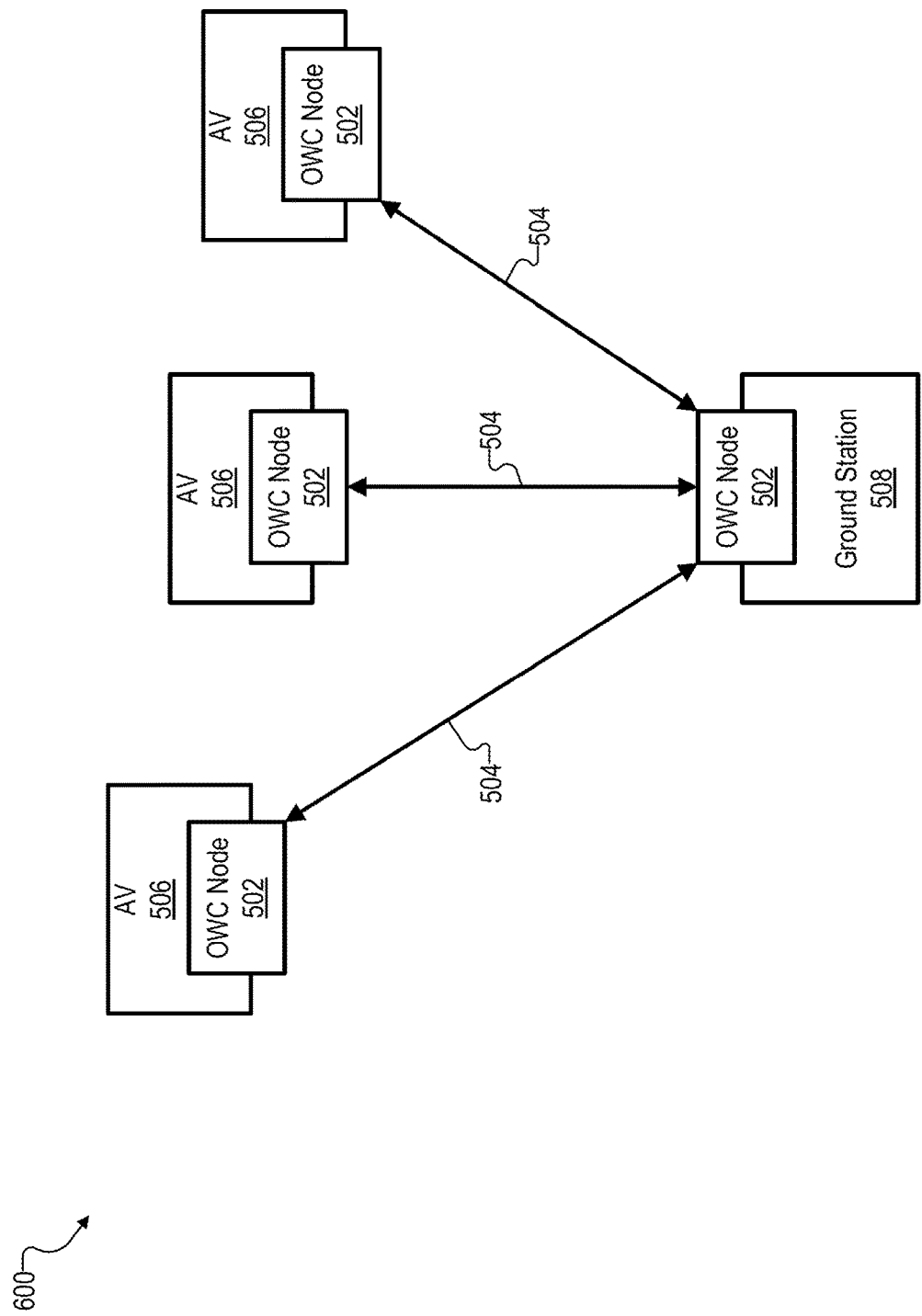

FIG. 6 illustrates an example configuration 600 that includes multiple OWC nodes 502 implemented on multiple AVs 506 positioned within line of sight of an OWC node 502 implemented at a ground station 508. As shown, an OWC link 504 may be provided between each OWC node 502 implemented on an AV 506 and the OWC node 502 implemented at the ground station 508.

Redundancies provided by positioning multiple airborne OWC nodes 502 within sight of an OWC node 502 at ground station 508 may be enhanced by deploying additional OWC nodes 502 at additional ground stations 508 such that an uplink location and/or a downlink location may include multiple OWC links 504 between multiple ground stations 508 and multiple AVs 506. The positions and/or densities of the AVs 506 and/or the ground stations 508 may be configured as may suit a particular implementation. The AVs 506 and/or the ground stations 508 may be arranged in any way configured to facilitate connectivity between at least one of the AVs 506 and at least one of the ground stations 508. For example, the AVs 506 may fly in a grid pattern, in a spiral pattern, and/or at various altitudes to maximize a probability that at least one of the AVs 506 will have line of site to a ground station 508 (e.g., through partial cloud cover).

An OWC node 502 may be configured to convert optical wireless signals to/from other types of communications signals (e.g., other types of wireless communications signals and/or wired communications signals). As an example, an OWC node 502 may receive any suitable form of communications signals carrying data and convert the communication signals to optical wireless signals carrying the data in any suitable way. The OWC node 502 may then transmit the optical wireless signals carrying the data. As another example, An OWC node 502 may receive optical wireless signals carrying data and convert the optical wireless signals to any other form of communication signals carrying the data in any suitable way. The OWC node 502 may then transmit the communication signals carrying the data.

An OWC node 502 that is configured to receive, process, and/or transmit multiple types of communications signals that include optical wireless signals and at least one other type of communications signals (e.g., at least one non-optical wireless signal) may be referred to as a hybrid OWC node 502. Examples of such hybrid OWC nodes 502 include an OWC node 502 configured to receive and convert optical wireless signals to another type of communications signals and transmit the other type of communication signals, an OWC node 502 configured to receive and convert a type of communications signals (other than optical wireless communications signals) to optical wireless signals and transmit the optical wireless signals. Such hybrid OWC nodes 502 may be implemented at any suitable locations in a communication network. For example, a hybrid OWC node 502 may be implemented at a ground station 508 and/or on an AV 506 configured to communicate with a communications node at a ground station 508 by way of communications signals other than optical wireless signals.

Figure 7:
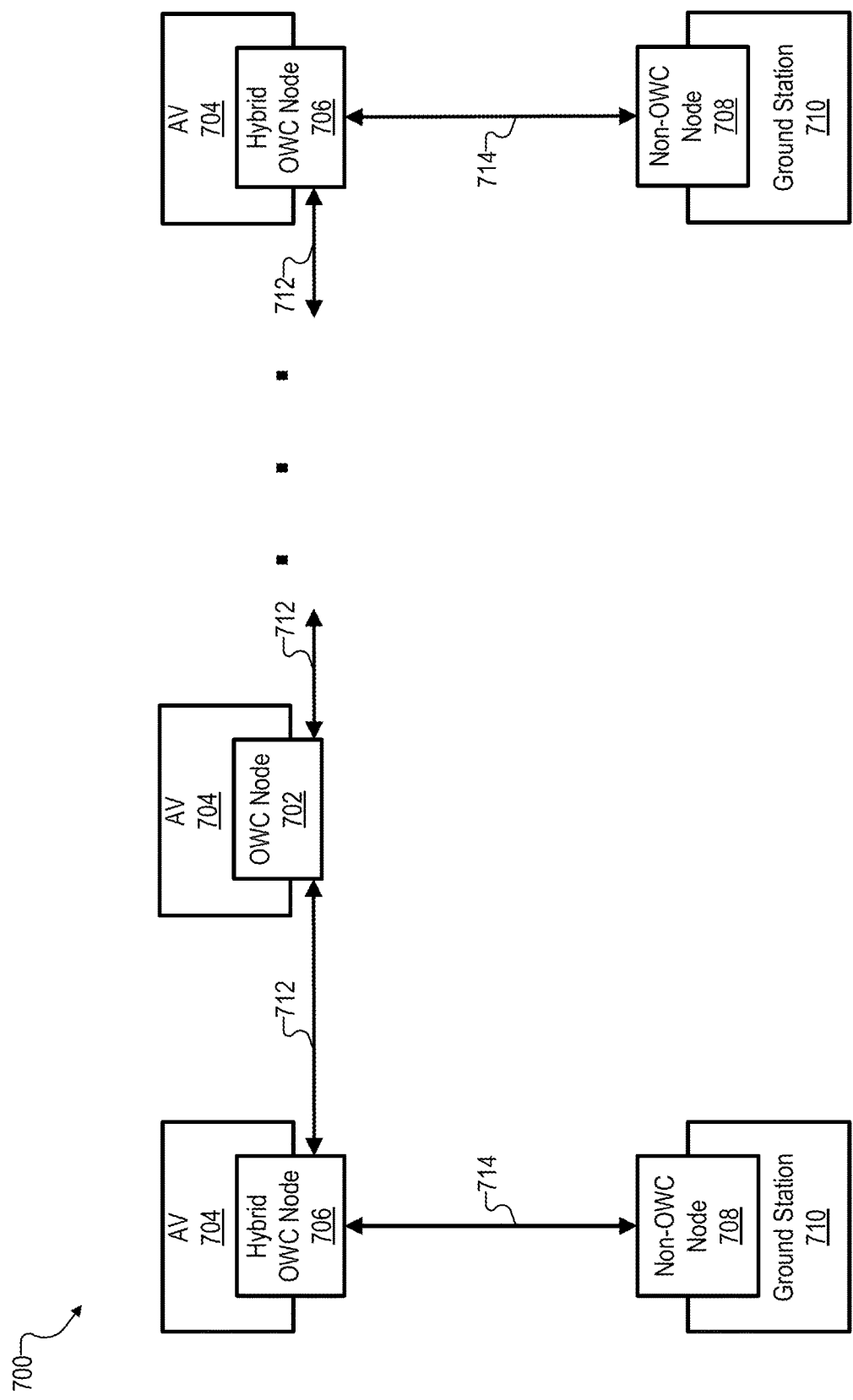

FIG. 7 illustrates an example configuration 700 that includes different types of communications nodes arranged to form a communication network. As shown, configuration 700 includes one or more OWC nodes 702 implemented on one or more AVs 704, hybrid OWC nodes 706 implemented on other AVs 704, and non-OWC nodes 708 implemented at ground stations 710. OWC nodes 702 and Hybrid OWC nodes 704 provide OWC links 712 between one another. Connectivity of OWC links 712 may be managed in any of the ways described herein.

In addition, hybrid OWC nodes 706 and non-OWC nodes 708 provide non-OWC links 714 between one another. Specifically, a first non-OWC link 714 is provided between a first hybrid OWC node 706 implemented on a first AV 704 and a first non-OWC node 708 implemented at a first ground station 710, and a second non-OWC link 714 is provided between a second hybrid OWC node 706 implemented on a second AV 704 and a second non-OWC node 708 implemented at a second ground station 710.

In configuration 700, communications signals other than optical wireless signals may be transmitted and received between ground stations 710 and AVs 704 (e.g., for uplink and downlink communications). The communications signals may be of any suitable type other than optical wireless signals. For example, the communications signals may include radio frequency signals or other non-optical wireless communications signals (e.g., 4G signals, 5G signals, or the like). Such non-optical wireless signals may be less affected by interference and noise than optical wireless signals. For example, the non-optical wireless signals may be more capable of traveling through cloud cover and other weather conditions than are optical wireless signals.

Hybrid OWC nodes 706 may be configured to convert between optical wireless signals and non-optical wireless signals. Thus, a hybrid OWC node 706 implemented on an AV 704 may receive non-optical wireless signals from a non-OWC node 708, convert the non-optical wireless signals to optical wireless signals, and transmit the optical wireless signals to an OWC node 702 implemented on another AV 704. Additionally, the hybrid OWC node 706 implemented on the AV 704 may receive optical wireless signals from an OWC node 702 implemented on another AV 704, convert the optical wireless signals to non-optical wireless signals, and transmit the non-optical wireless signals to a non-OWC node 708.

Configurations of systems and methods described herein may employ transmission topographies configured to account of loss in transmission. This may include transmitting redundant and/or repeating optical wireless signals and selecting which of the signals to use. For example, multiple aerial vehicles may be deployed and provide redundant OWC links in a chain of OWC links. System 108 may be configured to select which of the redundant OWC links to use.

Configurations of systems and methods described herein may facilitate connectivity between any number of OWC nodes. For example, an OWC node may be configured to concurrently maintain multiple OWC links to multiple other OWC nodes.

Configurations of systems and methods described herein may be configured to search for and detect optical wireless signals having specific attributes, such as specific pulses of light, frequencies, wavelengths, amplitudes, etc. To this end, transmitters of optical wireless signals may be configured to transmit primarily at wavelengths of intensities of light to account for natural sources such as the sun or other stars, and receivers (e.g., a telephoto lens) may be configured to receive at those wavelengths of intensities of light. This may help system 108 to distinguish target optical wireless signals from external light sources.

Systems and methods described herein may be applied for various use cases. As an example, systems and methods described herein may be deployed to provide increased communications capacity for an event, such as for communications to and from a geographic location during an event at the geographic location (e.g., during a football game and a football stadium). As another example, systems and methods described herein may be deployed to provide emergency communications associated with an emergency event (e.g., a power failure in an area), such as by providing, uplink and/or backhaul data communications to/from an area affected by the emergency event. As another example, systems and methods described herein may be deployed to provide long-range communications, such as long-range backhaul and/or core network data communications to/from a particular geographic location, such as across an ocean, to an island, to a remote location, etc. In some applications, the systems and methods described herein may provide "last-mile" communications to/from geographic locations (e.g., by implementing OWC nodes on structures such as utility poles, buildings, etc.).

Figure 8:
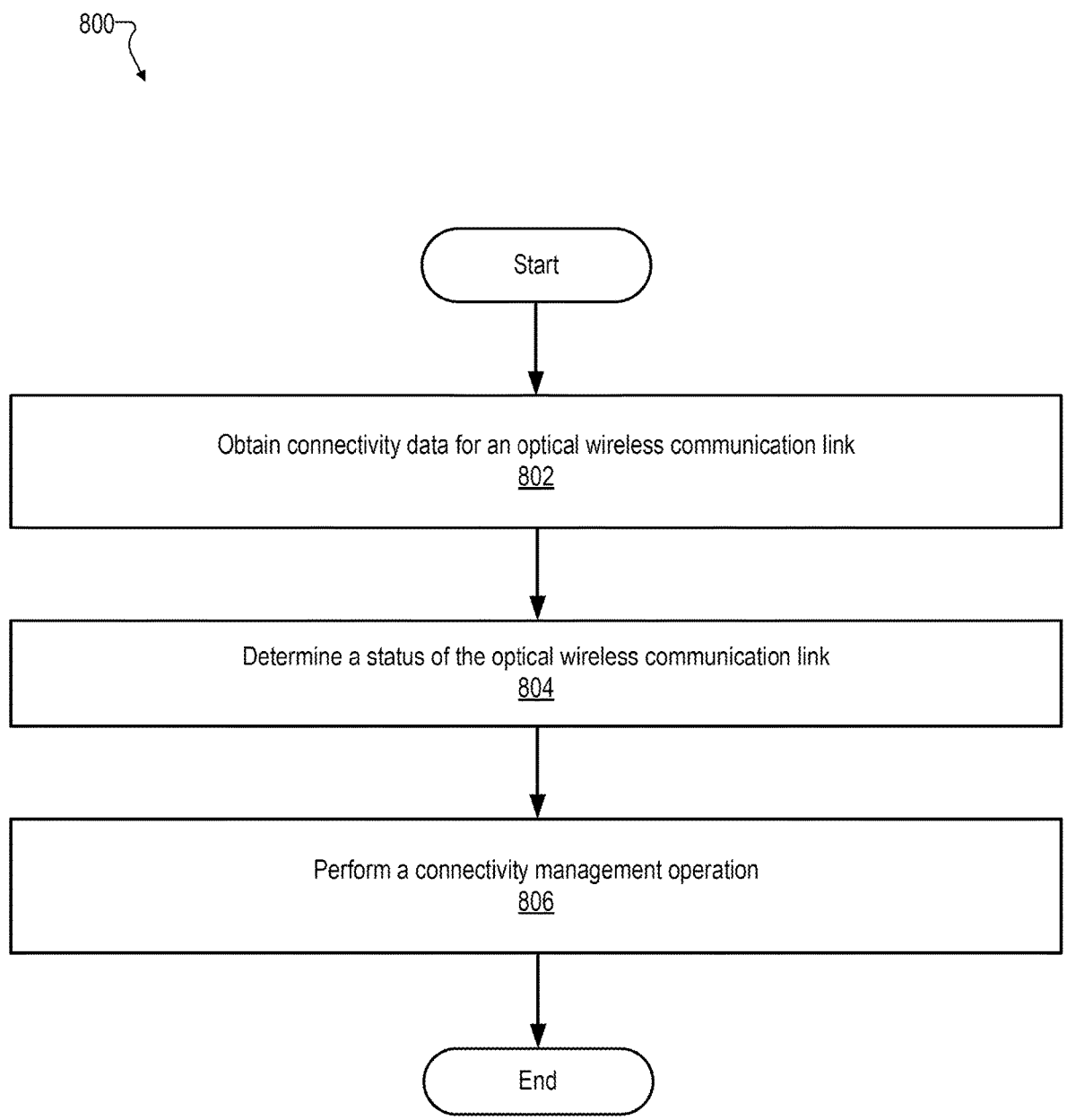
FIG. 8 shows an illustrative method for managing connectivity in an optical wireless communication link according to embodiments described herein.

FIG. 8 illustrates an example method 800. While FIG. 8 illustrates example operations according to one embodiment, other embodiments may omit, add to, reorder, combine, and/or modify any of the operations shown in FIG. 8. In some examples, multiple operations shown in FIG. 8 or described in relation to FIG. 8 may be performed concurrently (e.g., in parallel) with one another, rather than being performed sequentially as illustrated and/or described. One or more of the operations shown in FIG. 8 may be performed by a connectivity management system such as system 108 and/or any implementation thereof.

In operation 802, a system obtains connectivity data for an OWC link. The system may obtain the connectivity data in any of the ways described herein and/or in any other suitable way. Operation 802 may be performed in any of the ways described herein.

In operation 804, the system determines a status of the OWC link based on the connectivity data. Operation 804 may be performed in any of the ways described herein.

In operation 806, the system performs, based on the status of the OWC link, a connectivity management operation, which may be configured to facilitate connectivity across the OWC link (e.g., connectivity of an optical wireless signal receiver with an optical wireless signal transmitter. Operation 806 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 9:
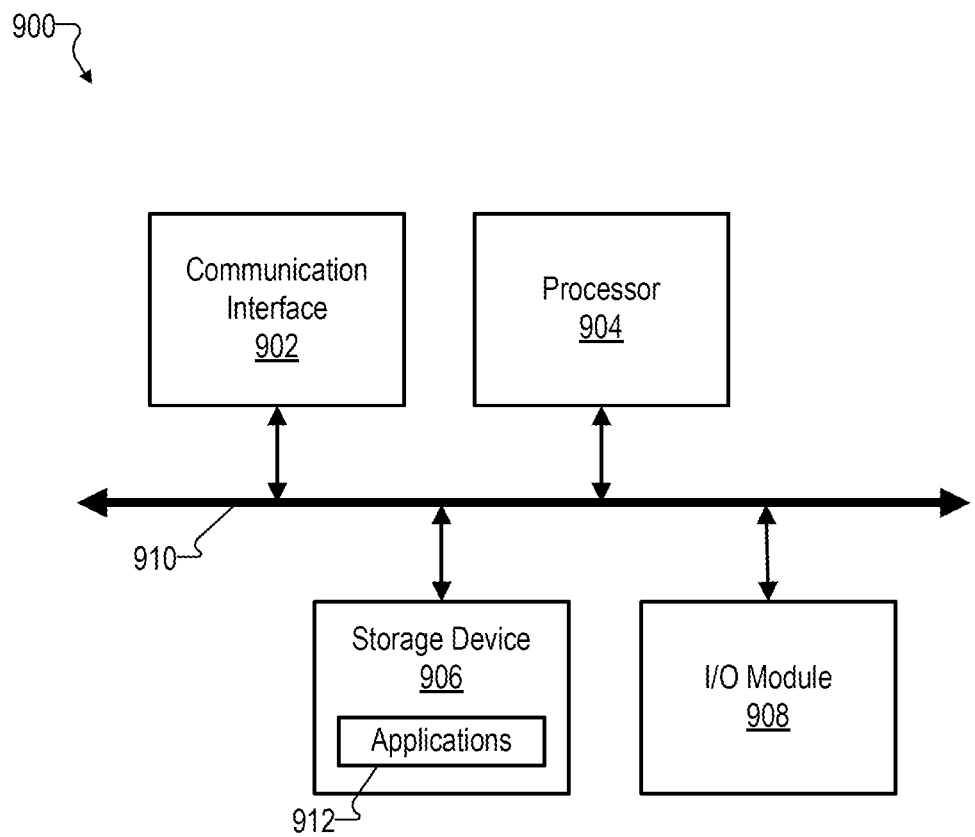
FIG. 9 shows an illustrative computing device according to embodiments described herein.

FIG. 9 shows an illustrative computing device 900 that may be specifically configured to perform one or more of the processes described herein. For example, computing device 900 may include or implement (or partially implement) a utilities-based network management system such as system 110 or any component included therein (e.g., a client exposure service system such as client exposure service system 402, a service registry system such as service registry system 404, a network anchor service system such as network anchor service system 406, a server selection system such as server selection system 408, etc.), an application development system such as application development system 412, a multi-access server such as one of multi-access servers 304, a client device such as one of client devices 306, or any other computing systems or devices described herein.

As shown in FIG. 9, computing device 900 may include a communication interface 902, a processor 904, a storage device 906, and an input/output (I/O) module 908 communicatively connected via a communication infrastructure 910. While an illustrative computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 906. For example, data representative of one or more executable applications 912 configured to direct processor 904 to perform any of the operations described herein may be stored within storage device 906. In some examples, data may be arranged in one or more databases residing within storage device 906.

I/O module 908 may include one or more I/O modules configured to receive user input and provide user output. One or more I/O modules may be used to receive input for a single virtual experience. I/O module 908 may include any hardware, firmware, software, or combination thereof supportive of input and output capabilities. For example, I/O module 908 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with processor 304 of system 108. Likewise, memory 302 of system 108 may be implemented by or within storage device 906.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. For example, certain features of one embodiment or example described herein may be combined with or substituted for features of another embodiment or example described herein. The description and drawings are accordingly to be regarded in an illustrative rather than a restrictive sense.

What is claimed is:

1. A method comprising:
obtaining, by a connectivity management system, connectivity data for an optical wireless communication link between an optical wireless signal transmitter implemented on a first in-flight aerial vehicle and an optical wireless signal receiver implemented on a second in-flight aerial vehicle;
determining, by the connectivity management system based on the connectivity data, a status of the optical wireless communication link; and
performing, by the connectivity management system based on the status of the optical wireless communication link, a connectivity management operation configured to facilitate connectivity of the optical wireless signal receiver with the optical wireless signal transmitter by way of the optical wireless communication link,
wherein:
the optical wireless signal receiver comprises a plurality of receivers configured to receive an optical wireless signal from the optical wireless signal transmitter by way of the optical wireless communication link, each receiver included in the plurality of receivers including a telephoto lens such that the plurality of receivers define an array of telephoto lenses, each telephoto lens included in the array of telephoto lenses provided on a same side of the second in-flight aerial vehicle; and
performing the connectivity management operation comprises coordinating a handoff from a first telephoto lens to a second telephoto lens in the array of telephoto lenses.

2. The method of claim 1, wherein the optical wireless communication link between the optical wireless signal transmitter implemented on the first in-flight aerial vehicle and the optical wireless signal receiver implemented on the second in-flight aerial vehicle forms at least part of a backhaul portion of a communication network.

3. The method of claim 2, wherein:
the first in-flight aerial vehicle and the second in-flight aerial vehicle are in flight in the stratosphere of earth.

4. The method of claim 1, wherein performing the connectivity management operation comprises directing the optical wireless signal receiver to perform an action configured to facilitate the connectivity of the optical wireless signal receiver with the optical wireless signal transmitter by way of the optical wireless communication link.

5. The method of claim 4, wherein the action comprises adjusting a pose of the second telephoto lens of the optical wireless signal receiver.

6. The method of claim 1, wherein:
the optical wireless signal receiver further comprises a tracking signal receiver that includes a tracking lens having a wider-angle field of view than at least one telephoto lens included in the array of telephoto lenses, the tracking signal receiver configured to track a position of the optical wireless signal transmitter; and
obtaining the connectivity data comprises receiving at least a portion of the connectivity data by way of the tracking lens.

7. The method of claim 1, wherein:
determining the status of the optical wireless communication link comprises identifying a movement of an optical wireless signal to a periphery region of a field of view of the optical wireless signal receiver; and
performing the connectivity management operation further comprises adjusting the optical wireless signal receiver to bring a central region of the field of view of the optical wireless signal receiver toward the optical wireless signal.

8. The method of claim 1, wherein performing the connectivity management operation further comprises directing at least one of the first in-flight aerial vehicle or the second in-flight aerial vehicle to adjust a pose of at least one of the first in-flight aerial vehicle or the second in-flight aerial vehicle to facilitate the connectivity of the optical wireless signal receiver with the optical wireless signal transmitter by way of the optical wireless communication link.

9. The method of claim 1, wherein the connectivity data comprises information about at least one of:
an attribute of the optical wireless signal transmitter;
an attribute of the first in-flight aerial vehicle;
an attribute of the optical wireless signal receiver;
an attribute of the second in-flight aerial vehicle; or
a weather condition associated with the optical wireless communication link.

10. The method of claim 1, embodied as computer-executable instructions on at least one non-transitory computer-readable medium.

11. A system comprising:
a memory storing instructions; and
a processor communicatively coupled to the memory and configured to execute the instructions to:
obtain connectivity data for an optical wireless communication link between an optical wireless signal transmitter implemented on a first in-flight aerial vehicle and an optical wireless signal receiver implemented on a second in-flight aerial vehicle;
determine, based on the connectivity data, a status of the optical wireless communication link; and
perform, based on the status of the optical wireless communication link, a connectivity management operation configured to facilitate connectivity of the optical wireless signal receiver with the optical wireless signal transmitter by way of the optical wireless communication link,
wherein:
the optical wireless signal receiver comprises a plurality of receivers configured to receive an optical wireless signal from the optical wireless signal transmitter by way of the optical wireless communication link, each receiver included in the plurality of receivers including a telephoto lens such that the plurality of receivers define an array of telephoto lenses, each telephoto lens included in the array of telephoto lenses provided on a same side of the second in-flight aerial vehicle; and
performing the connectivity management operation comprises coordinating a handoff from a first telephoto lens to a second telephoto lens in the array of telephoto lenses.

12. The system of claim 11, wherein:
the optical wireless communication link between the optical wireless signal transmitter implemented on the first in-flight aerial vehicle and the optical wireless signal receiver implemented on the second in-flight aerial vehicle forms at least part of a backhaul portion of a communication network; and
the first in-flight aerial vehicle and the second in-flight aerial vehicle are in flight in the stratosphere of earth.

13. The system of claim 11, wherein the connectivity management operation comprises directing the optical wireless signal receiver to adjust a pose of the second telephoto lens of the optical wireless signal receiver.

14. The system of claim 11, wherein the connectivity management operation comprises coordinating a handoff of the optical wireless communication link from the optical wireless signal receiver to another optical wireless signal receiver.

15. The system of claim 11, wherein the connectivity management operation comprises adjusting the optical wireless signal receiver to bring a central region of a field of view of the optical wireless signal receiver toward an optical wireless signal received over the optical wireless communication link.

16. A system comprising:
   a plurality of optical wireless communication (OWC) nodes configured to transmit and receive optical wireless signals to provide an optical wireless backhaul portion of a data communication network; and
   a connectivity management system configured to:
      obtain connectivity data for an optical wireless communication link between a first OWC node of the OWC nodes and a second OWC node of the OWC nodes;
      determine, based on the connectivity data, a status of the optical wireless communication link; and
      perform, based on the status of the optical wireless communication link, a connectivity management operation configured to facilitate connectivity of the second OWC node with the first OWC node by way of the optical wireless communication link,
   wherein:
      the second OWC node comprises a plurality of receivers configured to receive an optical wireless signal from the first OWC node by way of the optical wireless communication link, each receiver included in the plurality of receivers including a telephoto lens such that the plurality of receivers define an array of telephoto lenses, each telephoto lens included in the array of telephoto lenses provided on a same side of the second OWC node; and
      performing the connectivity management operation comprises coordinating a handoff from a first telephoto lens to a second telephoto lens in the array of telephoto lenses.

17. The system of claim 16, wherein:
the first OWC node is implemented on a first aerial vehicle that is in-flight in the stratosphere of earth; and
the second OWC node is implemented on a second aerial vehicle that is in-flight in the stratosphere of earth.

* * * * *